Jan. 3, 1961  C. L. HILL  2,967,029
AIRCRAFT VERTICAL LIFT DEVICE
Filed July 21, 1958  2 Sheets-Sheet 1

INVENTOR.
CHARLES L. HILL
BY
*Dan J. Hatfield*
ATTORNEY

Jan. 3, 1961     C. L. HILL     2,967,029
AIRCRAFT VERTICAL LIFT DEVICE
Filed July 21, 1958     2 Sheets-Sheet 2
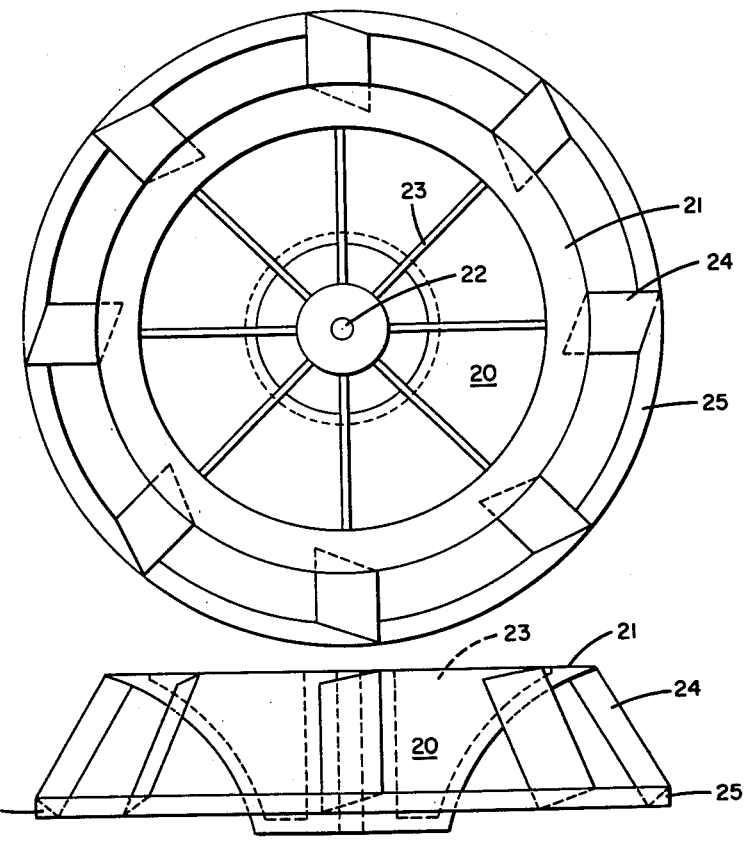
Fig. 3
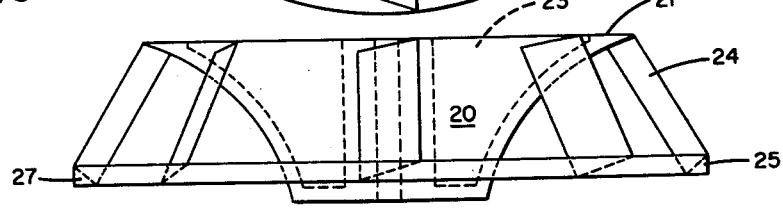
Fig. 4
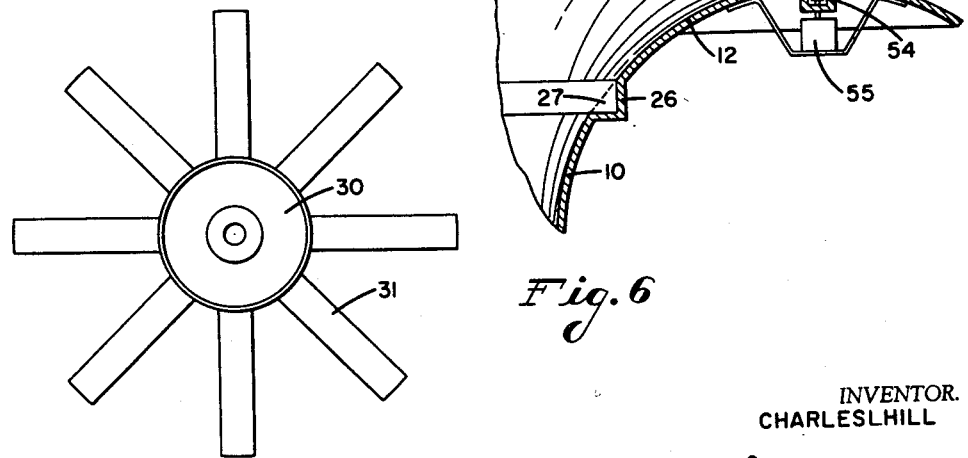
Fig. 5
Fig. 6
INVENTOR.
CHARLES L HILL
BY    *Dee T. Hatfield*
ATTORNEY ced Jan. 3, 1961

United States Patent Office 2,967,029
Patented Jan. 3, 1961

2,967,029

AIRCRAFT VERTICAL LIFT DEVICE

Charles L. Hill, 111 Foster St., Olney, Ill.

Filed July 21, 1958, Ser. No. 749,811

16 Claims. (Cl. 244—23)

This invention relates to aircraft lift devices and more particularly to a vertical lift aircraft device capable of either vertical motion or combined vertical and horizontal movements in controlled directions.

Vertical lift devices employing annular ducts with airfoil cross-section and with propellers, fans or the like to draw air over the airfoil and thereby provide lifting forces are well known.

It is a principal object of this invention to provide an improved vertical lift device of the so-called airfoil duct type.

Another object of the invention is to provide an improved vertical lift device that effectively combines the forces of airfoil lift and jet reaction to obtain improved lifting characteristics.

Yet another important object of the invention is to provide an aircraft of the vertical lift airfoil duct type having improved means to controllably alter the airfoil lifting forces in predetermined segments of the annular airfoil to thereby provide tilting and horizontal moving force components in a desired direction.

Another object of the invention is to provide a vertical lift device of the airfoil duct type having an improved arrangement of air-propelling devices to provide a most efficient flow of air over the airfoil into the duct and to eject such air in a manner to provide maximum jet reaction forces to thereby obtain combined airfoil and jet reaction lift forces.

Further objects, features and the attending advantages of the invention will be apparent with reference to the following specification and drawings in which:

Fig. 3 is a top plan view of the primary or centripetal fan;

Fig. 4 is a side view of the centripetal fan;

Fig. 5 is a plan view of the secondary or booster fan; and

Fig. 6 is a detailed cross-section of the upper airfoil portion of the duct showing an arrangement for mounting spoiler strips.

Figure 1:
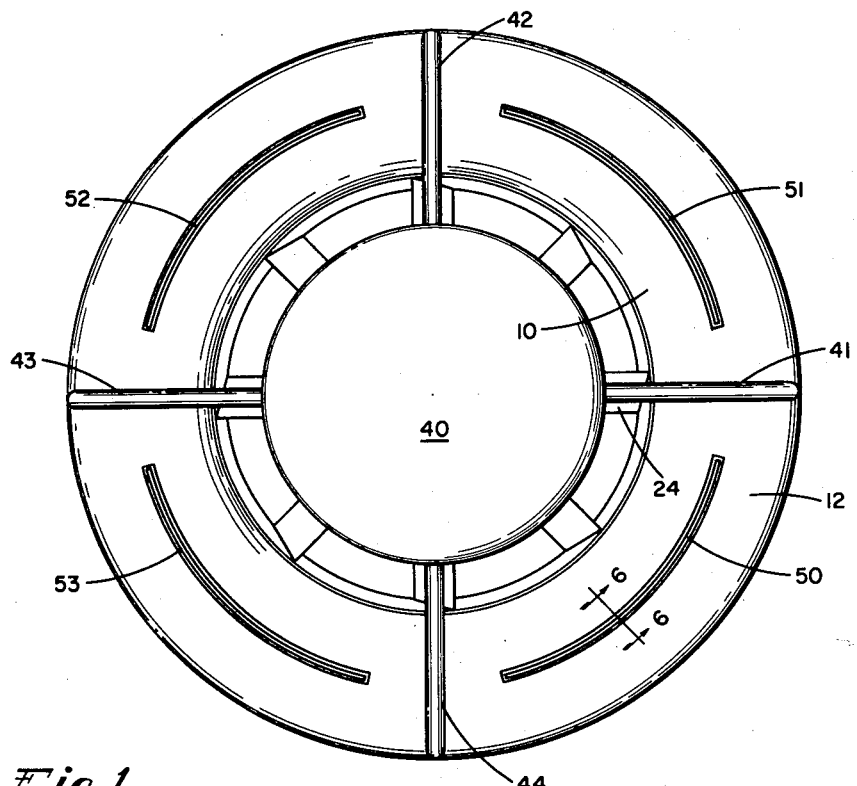
Fig. 1 is a top plan view of the lift device of the invention.
Figure 2:
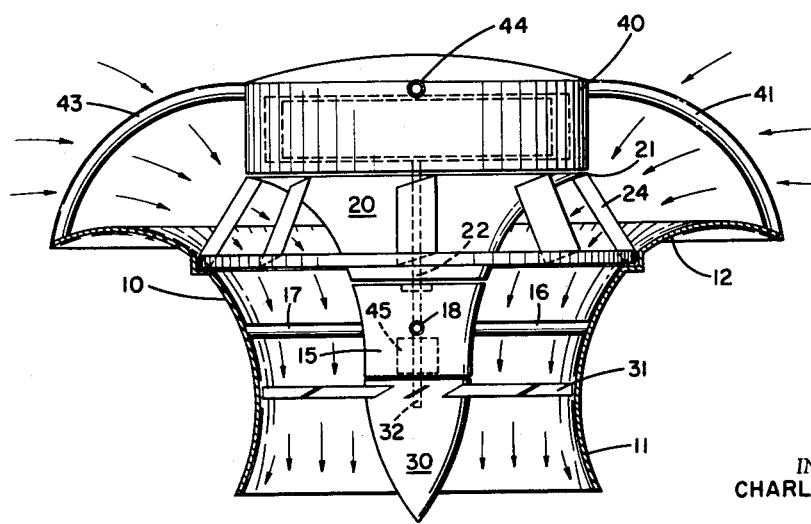
Fig. 2 is a side view with the duct in section to show the arrangement of parts within the duct.

Referring now to the drawings and most particularly to Figures 1 and 2, the lift device is comprised of an annular duct generally shown at 10 having a lower outwardly flaring jet exhaust portion or section 11 and an upper outwardly flaring section 12 with an essentially annular airfoil cross-section as shown. Mounted within the duct 10 is a central core 15 which may be supported by a plurality of radially extending rods 16–18, and it will be noted that the surface of the core 15 is generally complementary in shape to the opposite shaped portions of the duct 10. Mounted on the top of the core 15 is a primary centripetal fan structure generally shown at 20 and supported from the bottom of the core 15 is a secondary booster fan structure generally shown at 30. It will be noted that the centripetal fan 20 is positioned partially within and partially above the duct 10 while the booster fan 30 is positioned with its radial fan blades such as shown at 31 within the duct 10 adjacent the most narrow diameter thereof. I have found that the aforementioned positions of the fans 20 and 30 provide the maximum efficiency and lift for the vertical lift device of the invention. With this arrangement, the hub 21 of the centripetal fan forms an air-flow shaped duct extension relative to the annular airfoil section 12.

A stationary cylindrical deflector box 40 is supported by struts 41–44 above and concentric with the airfoil duct 10 and the upper end of the hub of the centripetal fan 20. The deflector box 40 is preferably of a diameter equal to the maximum diameter of the hub 21 of the centripetal fan 20 and functions to force a maximum amount of the air drawn in by the centripetal fan to pass over the upper airfoil portions 12 of the duct 10.

Any suitable form of motive power may be mounted either in the cylindrical deflector box 40 or in the central core 15 or positioned below the secondary fan to rotate the centripetal fan shaft 22 or booster fan shaft 32. In addition a gear box 45 is provided to connect the centripetal fan shaft 22 to the booster fan shaft 32 so that the booster fan 30 may preferably be driven at a somewhat higher speed than the centripetal fan 20 in order to prevent any turbulence or negative pressures in the flow of air through the duct 10 and to gain maximum effectiveness of said fan 30. The fans may be driven in the same direction or in opposite directions to help counteract inherent torque.

Referring now more particularly to Figs. 3, 4 and 6 of the drawings, it will be seen that the centripetal fan 20 is comprised of a hub portion 21 having a complementary shaped airfoil surface with reference to the opposite airfoil surfaces 12 of the duct 10. Internal radial strengthening webs such as 23 may be provided and the hub 21 may be built-up or cast in a single unit as desired. A plurality of fan blades such as 24 are fastened between the hub 21 and an outer fan ring 25. The fan ring 25 fits within an annular depression 26 of the duct 10 and has a cross-sectional shape to provide a surface 27 (see dotted lines) forming an extension of the duct airfoil shape across the depression 26 thereby preserving the desired airfoil surface and minimizing turbulences.

Referring now more particularly to Figs. 1 and 6 of the drawings, a plurality of spoiler strips 50–53 may be disposed in circumferential grooves such as shown at 54 on the upper surface of the annular airfoil 12. While four spoiler strips are shown to be disposed in quartered segments of the duct 10 it should be understood that a more or less number of spoiler strips suitably arranged may be provided. Normally, each spoiler strip such as the strip 50 rests within the groove 54 with its upper surface forming a continuation of the airflow surface 12. However, when desired, selective ones of the spoiler strips such as strip 50 may be raised to the dotted line position (Fig. 6) upon suitable controlled energization of the solenoid 55. When a spoiler strip is raised, the flow of air over the airfoil in that segment or vicinity of the duct 10 is disrupted to create turbulences and reduce the airfoil lift at that point to thuse cause tilting of the vertical lift device and thereby effect a horizontal component of force in a desired direction. In place of the solenoid 55, any suitable servo-controlled mechanism may be provided.

Various modifications may be made within the spirit of the invention and the scope of the appended claims. It should be understood that one or more of the vertical lift devices of the invention may be disposed in various arrangements on a suitable aircraft frame to provide personnel and cargo-carrying facilities.

What is claimed is:

1. An aircraft vertical lift device comprising, an annular duct having a lower outwardly flaring jet exhaust section and an upper outwardly flaring annular airfoil section, an inner core centrally located within said duct and having a complemental airfoil surface with respect to the airfoil shape of said duct, a centripetal fan positioned at the top of said core partially within said duct adjacent the upper flaring section thereof and with its axis of rotation in alignment with the axis of said annular duct, a booster fan positioned within said duct beneath said core and with its axis of rotation in alignment with the axis of said annular duct, and means to rotate both said centripetal fan and said booster fan to draw air in over the upper outwardly flaring airfoil of said duct and eject said air with jet force from the lower section of said duct.

2. The invention of claim 1 in which said centripetal fan is provided with a hub portion having a complementary airfoil shape with reference to the adjacent airfoil shape of said duct.

3. The invention of claim 1 in which said booster fan is positioned within said duct at substantially the narrowest diameter portion thereof.

4. The invention of claim 1 in which said centripetal fan is provided with a hub portion having a complementary airfoil shape with reference to the adjacent airfoil shape of said duct, and said booster fan is positioned within said duct at substantially the narrowest diameter thereof.

5. An aircraft vertical lift device comprising, an annular duct having a lower outwardly flaring jet exhaust section and an upper outwardly flaring annular airfoil section, an inner core centrally located within said duct and having a complemental airfoil surface with respect to the airfoil shape of said duct, a centripetal fan having a hub portion positioned at the top of said core partially within said duct adjacent the upper flaring section thereof and with its axis of rotation in alignment with the axis of said annular duct, a stationary cylindrical deflector mounted above said centripetal fan and having a diameter at least as great as the adjacent diameter of the hub of said centripetal fan, a booster fan positioned within said duct beneath said core and with its axis of rotation in alignment with the axis of said annular duct, and means to rotate both said centripetal fan and said booster fan to draw air in over the upper outwardly flaring airfoil of said duct and eject said air with jet force from the lower section of said duct.

6. The invention of claim 5 in which the hub portion of said centripetal fan is provided with a complementary airfoil shape with reference to the adjacent airfoil shape of said duct.

7. The invention of claim 5 in which said booster fan is positioned within said duct at substantially the narrowest diameter portion thereof.

8. The invention of claim 5 in which the hub portion of said centripetal fan is provided with a complementary airfoil shape with reference to the adjacent airfoil shape of said duct, and said booster fan is positioned within said duct at substantially the narrowest diameter thereof.

9. An aircraft vertical lift device comprising, an annular duct having a lower outwardly flaring jet exhaust section and an upper outwardly flaring annular airfoil section, one or more spoiler strips normally resting beneath the upper surface of the annular airfoil section of said duct in predetermined segments thereof, means to selectively raise each of said spoiler strips above the upper airfoil surface section of said duct to disrupt the flow of air over such portion of the airfoil and correspondingly spoil the airfoil lift action of that segment of the annular airfoil section, an inner core centrally located within said duct and having a complemental airfoil surface with respect to the airfoil shape of said duct, a centripetal fan positioned at the top of said core partially within said duct adjacent the upper flaring annular section thereof and with its axis of rotation in alignment with the axis of said annular duct, a booster fan positioned within said duct beneath said core and with its axis of rotation in alignment with the axis of said annular duct, and means to rotate both said centripetal fan and said booster fan to draw air in over the upper outwardly flaring airfoil section of said duct and eject said air with jet force from the lower section of said duct.

10. The invention of claim 9 in which said centripetal fan is provided with a hub portion having a complementary airfoil shape with reference to the adjacent airfoil shape of said duct.

11. The invention of claim 9 in which said booster fan is positioned within said duct at substantially the narrowest diameter portion thereof.

12. The invention of claim 9 in which said centripetal fan is provided with a hub portion having a complementary airfoil shape with reference to the adjacent airfoil shape of said duct, and said booster fan is positioned within said duct at substantially the narrowest diameter thereof.

13. An aircraft vertical lift device comprising, an annular duct having a lower outwardly flaring jet exhaust section and an upper outwardly flaring annular airfoil section, one or more spoiler strips normally resting beneath the upper surface of said annular airfoil section of said duct in predetermined segments thereof, means to selectively raise each of said spoiler strips above the airfoil surface of said duct to disrupt the flow of air over such portion of the airfoil and correspondingly spoil the airfoil lift action of that segment of the annular airfoil section, an inner core centrally located within said duct and having a complemental airfoil surface with respect to the airfoil shape of said duct, a centripetal fan having a hub portion positioned at the top of said core partially within said duct adjacent the upper flaring section thereof and with its axis of rotation in alignment with the axis of said annular duct, a stationary cylindrical deflector mounted above said centripetal fan and having a diameter at least as great as the adjacent diameter of the hub of said centripetal fan, a booster fan positioned within said duct beneath said core and with its axis of rotation in alignment with the axis of said annular duct, and means to rotate both said centripetal fan and said booster fan to draw air in over the upper outwardly flaring airfoil of said duct and eject said air with jet force from the lower section of said duct.

14. The invention of claim 13 in which the hub portion of said centripetal fan is provided with a complementary airfoil shape with reference to the adjacent airfoil shape of said duct.

15. The invention of claim 13 in which said booster fan is positioned within said duct at substantially the narrowest diameter portion thereof.

16. The invention of claim 13 in which the hub portion of said centripetal fan is provided with a complementary airfoil shape with reference to the adjacent airfoil shape of said duct, and said booster fan is positioned within said duct at substantially the narrowest diameter thereof.

References Cited in the file of this patent

UNITED STATES PATENTS

| | | |
|---|---|---|
| 1,123,589 | Porter | Jan. 5, 1915 |
| 2,718,364 | Crabtree | Sept. 20, 1955 |
| 2,859,004 | Lopiccolo | Nov. 4, 1958 |

FOREIGN PATENTS

| | | |
|---|---|---|
| 339,462 | Italy | Apr. 22, 1936 |